United States Patent [19]

Ueno

[11] Patent Number: 5,341,254
[45] Date of Patent: Aug. 23, 1994

[54] TAPE RECORDING AND/OR REPRODUCING APPARATUS

[75] Inventor: Noriyuki Ueno, Tokyo, Japan
[73] Assignee: Sony Corporation, Tokyo, Japan
[21] Appl. No.: 776,875
[22] Filed: Oct. 16, 1991

Related U.S. Application Data

[63] Continuation of Ser. No. 374,052, Jun. 30, 1989, abandoned.

[30] Foreign Application Priority Data

Jul. 6, 1988 [JP] Japan .............................. 63-168088
Jul. 6, 1988 [JP] Japan .............................. 63-168089
Jul. 6, 1988 [JP] Japan .............................. 63-168090

[51] Int. Cl.$^5$ .................... G11B 15/12; G11B 15/18
[52] U.S. Cl. .................................. 360/62; 360/69; 360/137; 360/61
[58] Field of Search ............... 360/61, 69, 62, 137; 369/2, 7, 19, 69; 439/709, 682, 43, 638; 339/183

[56] References Cited

U.S. PATENT DOCUMENTS

| 3,749,852 | 7/1973 | Moriya et al. ............... 360/62 |
| 3,752,935 | 8/1973 | Iwawaki ........................ 360/62 |
| 4,338,638 | 7/1982 | Orita ............................. 360/61 |
| 4,366,513 | 12/1982 | Satoh et al. .................. 360/66 |
| 4,420,216 | 12/1983 | Motoyama et al. .......... 339/183 |
| 4,420,777 | 12/1983 | Furuta .......................... 360/61 |
| 4,433,209 | 2/1984 | Kurosawa et al. ........... 381/25 |
| 4,475,231 | 10/1984 | Elster ............................ 381/88 |
| 4,636,392 | 1/1987 | Scott ............................ 381/187 |
| 4,677,658 | 6/1987 | Kolodny et al. .............. 369/25 |

FOREIGN PATENT DOCUMENTS

| 58-32252 | 2/1983 | Japan ........................... G11B 15/10 |
| 59-54062 | 3/1984 | Japan ........................... G11B 15/10 |
| 59-132475 | 7/1984 | Japan ........................... G11B 31/00 |
| 431120 | 2/1967 | Switzerland ................. G11B 31/00 |
| 2077023 | 12/1981 | United Kingdom .......... G11B 15/10 |

OTHER PUBLICATIONS

Allied electronics catalog p. 372 1963, Catalog 220.

*Primary Examiner*—Aristotelis Psitos
*Assistant Examiner*—Varsha V. Sheladia
*Attorney, Agent, or Firm*—Lewis H. Eslinger; Jay H. Maioli

[57] ABSTRACT

Apparatus is provided for switching between recording and playback modes of a tape recorder having a single input/output jack to which an output plug for an earphone, a headphone or the like, or an input plug for a microphone or the like can be connected. The jack is compatible with two channels. When a remote-control unit having a remote-control switch and connected to an input/output transducer is connected to the jack, one channel is used as an input channel for a remote-control signal, and the other channel is used as an input/output channel for an audio signal. In another embodiment, the tape recorder has a control circuit for discriminating between insertion of a 1-channel plug and insertion of a 2-channel plug into the 2-channel jack to control the operation of switches included in this tape recorder.

10 Claims, 3 Drawing Sheets

TAPE RECORDING AND/OR REPRODUCING APPARATUS

This is a continuation of application Ser. No. 07/374,052, filed Jun. 30, 1989 now abandoned.

FIELD OF THE INVENTION

This invention relates to apparatus for switching between REC (recording) and PB (playback) modes of a tape recorder to which an external earphone and an external microphone are connected to perform recording and reproduction, and to apparatus used for remote control of a tape recorder or the like.

DESCRIPTION OF THE PRIOR ART

In conventional compact tape recorders (e.g., cassette tape recorders and headphone stereo units) and remote-controlled compact tape recorders, an input jack that receives a microphone plug, an output jack that receives an earphone plug, and a jack that receives a remote-control unit are independently provided, or a common jack that cooperates with a microphone, an earphone and a remote-control unit is provided together with an exclusive selection switch that configures the common jack to serve as a microphone jack, an earphone jack or a remote-control jack. A tape recorder provided with the two or three jacks has an inefficient space utilization factor and cannot be made sufficiently compact for certain purposes. When a common earphone/microphone unit obtained by integrating an earphone and microphone by using an electromagnetic converting means is used in the tape recorder, a user must substitute an earphone/microphone plug in accordance with the PB or REC mode; therefore, the earphone/microphone unit cannot be efficiently utilized. In a tape recorder having the common jack and the exclusive selection switch, the selection switch must be operated manually in accordance with the selected mode, which is cumbersome and inconvenient. In addition, the user tends to forget to select the appropriate mode with the selection switch.

OBJECTS AND SUMMARY OF THE INVENTION

It is an object of the present invention to provide apparatus for switching between REC and PB modes of a tape recorder that can be connected to an external earphone or headphone and an external microphone to perform recording and reproduction by using one jack as an input/output jack.

It is another object of the present invention to provide apparatus for switching between REC and PB modes of a tape recorder, wherein input and output states of a jack are automatically switched or interlocked with a record/playback selection switch when an earphone/microphone plug is connected to the jack.

It is still another object of the present invention to provide apparatus for switching between REC and PB modes of a tape recorder wherein a control signal input from a remote-control unit for controlling the operation mode of the tape recorder, the output to an earphone, and the input from a microphone can be transmitted through one jack.

It is still another object of the present invention to provide apparatus for switching between REC and PB modes of a tape recorder including a control circuit for determining whether a plug connected to a 2-channel jack is of 2- or 1-channel type, and for inhibiting operation mode setting control by an operation switch in the tape recorder main body and enabling operation mode setting control by the control signal from the plug when a 2-channel plug is connected.

The foregoing and other objects of the invention are attained in accordance with one aspect thereof by the provision of apparatus for switching between recording and playback modes of a tape recorder, the apparatus comprising: an input/output jack having a ground terminal, a fixed terminal and a movable terminal; recording amplifier means having an input terminal; playback amplifier means having an output terminal; and switching means for connecting the input terminal of the recording amplifier means and the output terminal of the playback amplifier means to the movable terminal of the jack in the recording and playback modes, respectively.

In accordance with an independent aspect of the invention, there is provided apparatus for switching between recording and playback modes of a tape recorder, comprising: a tape recorder main body; a jack compatible with at least two channels and formed in the tape recorder main body; a predetermined operation switch arranged in the tape recorder main body; detecting means connected to the jack for detecting whether a 1-channel plug or a 2-channel plug is inserted into the jack; and a control circuit, responsive to the detecting means, for enabling a function of the predetermined operation switch when a 1-channel plug is inserted and for disabling the function of the predetermined operation switch when a 2-channel plug is inserted.

In accordance with another independent aspect of the invention, there is provided a remote control unit for a tape recorder, comprising a remote-control switch for outputting a control signal for performing a remote-control operation of the tape recorder and an input/output unit to which output signal system means or input signal system means can be connected and which inputs or outputs an audio signal, the remote-control unit further comprising a plug compatible with two channels to supply the control signal to the tape recorder through one of the channels and to input or output the audio signal through the other of the channels.

BRIEF DESCRIPTION OF THE DRAWINGS

A better understanding of the objects, features and advantages of the invention can be gained from a consideration of the following detailed description of the preferred embodiments thereof, in conjunction with the appended figures of the drawing, throughout which the same reference characters indicate the same elements or parts, and wherein.

DESCRIPTION OF THE PREFERRED EMBODIMENTS

An embodiment of the present invention will be described in detail with reference to FIG. 1.

Figure 1:
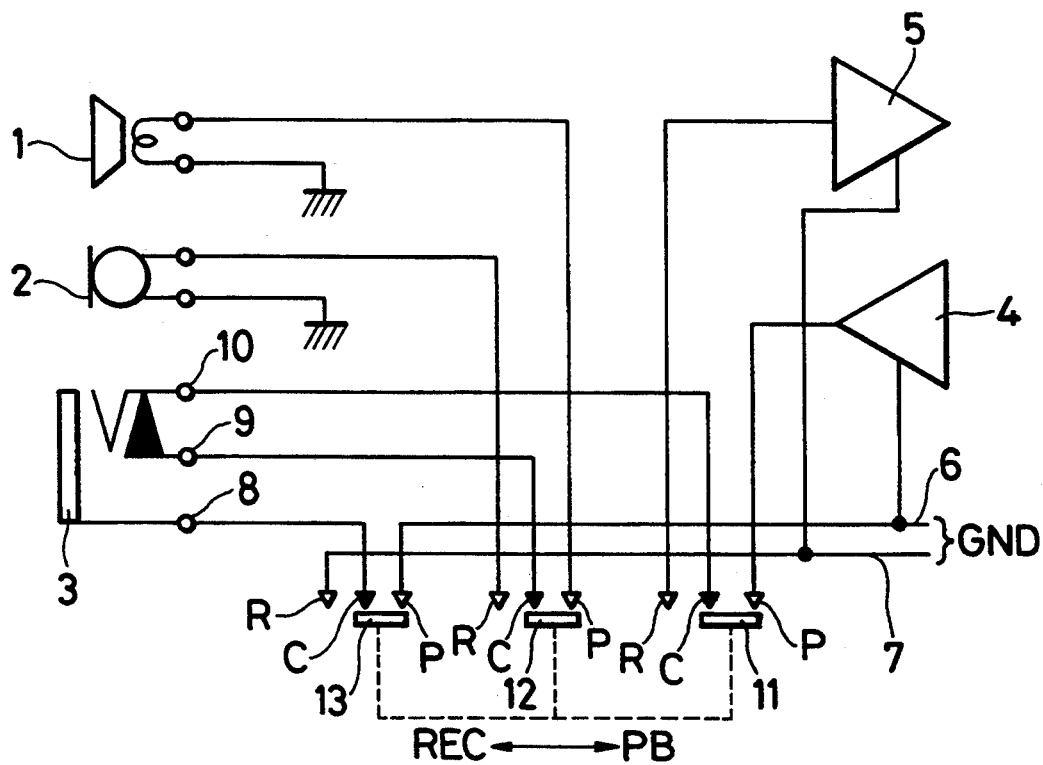
FIG. 1 is a circuit diagram showing apparatus for switching between REC and PB modes of a tape recorder according to an embodiment of the present invention.

In FIG. 1, reference number 1 denotes a speaker incorporated in a tape recorder; 2, a microphone incorporated therein; and 3, a jack having a ground terminal 8, a fixed terminal 9, and a movable terminal 10. The jack 3 selectively receives an earphone plug connected to an external earphone or headphone, a microphone plug connected to an external microphone, or a earphone/microphone plug connected to an earphone/microphone. When a plug is not inserted in the jack 3, the movable terminal 10 is in contact with the fixed terminal 9. When a plug is inserted into the jack 3, the movable terminal 10 is separated from the fixed terminal 9. Reference numberal 4 denotes a playback amplifier; 5, a recording amplifier; 6, a ground line of the playback amplifier 4; 7, a ground line for the recording amplifier 5; and 11, 12 and 13, recording/playback ganged selection switches that are interlocked with depression of REC (recording) and PB (playback) buttons of the tape recorder. Each of the switches 11, 12 and 13 has a recording contact R, a common contact C, and a playback contact P. The switch 11 is used to selectively connect the playback or recording amplifier 4 or 5 to the movable terminal 10; the switch 12 is used to selectively connect the speaker 1 or the microphone 2 to the fixed terminal 9; and the switch 13 is used to selectively connect the playback or recording amplifier 4 or 5 to the corresponding ground line 6 or 7.

FIG. 1 shows the tape recorder in the PB mode. An output signal from the playback amplifier 4 is supplied to the speaker 1 through the contacts P and C of the switch 11, the movable and fixed terminals 10 and 9, and the contacts C and P of the switch 12. In the PB mode, when the external earphone plug or the external earphone/microphone plug is inserted into the jack 3, the movable terminal 10 is separated from the fixed terminal 9. In this state, the speaker 1 is disconnected, and at the same time, a playback output signal is sent from the movable terminal 10 to the earphone or the earphone/microphone through the inserted plug. In this case, the ground line 6 is connected to the terminal 8 through the contracts P and C of the switch 13.

When a plug is not inserted into the jack 3 and the switches 11, 12 and 13 are switched to the REC side to set the REC mode, a recording signal from the microphone 2 is supplied to the recording amplifier 5 through the contacts R and C of the switch 12, the fixed and movable terminals 9 and 10, and the contacts C and R of the switch 11.

In the REC mode, when the external microphone plug or the external earphone/microphone plug is inserted in the jack 3, the movable terminal 10 is separated from the fixed terminal 9, and therefore the microphone 2 is disconnected. An input signal from the external microphone is supplied from the plug to the recording amplifier 5 through the movable terminal 10 and the contacts C and R of the switch 11. In this case, the ground line 7 is connected to the terminal 8 through the contacts R and C of the switch 13.

This embodiment exemplifies a tape recorder that incorporates the speaker 1 and the microphone 2. The switch 12 is omitted in a tape recorder that does not incorporate the speaker 1 and the microphone 2.

Figure 2:
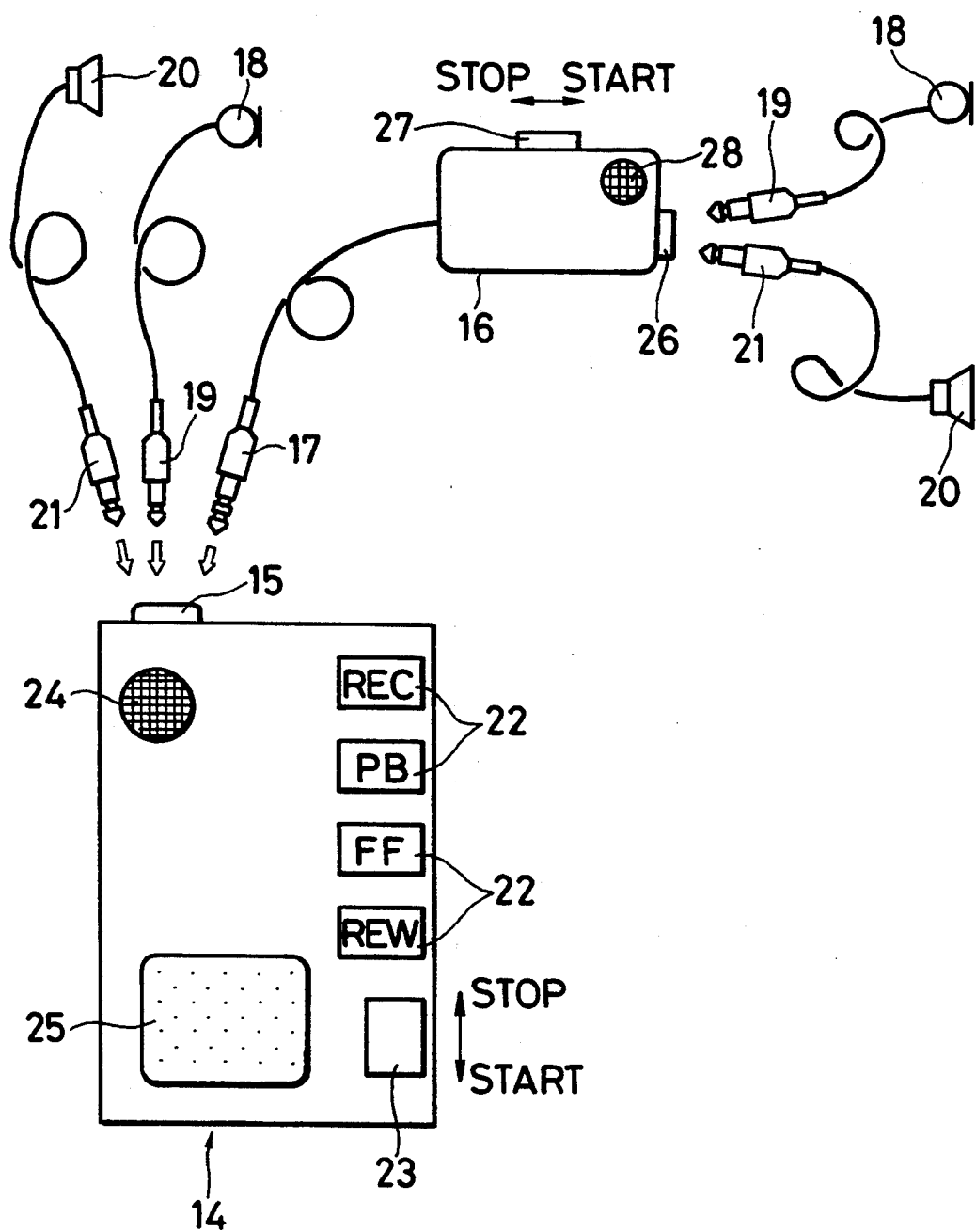
FIG. 2 is a diagrammatic view showing a tape recorder system having a remote-control unit according to another embodiment of the present invention.

FIG. 2 shows another embodiment of the invention. In FIG. 2, a tape recorder 14 is controlled by a remote-control unit, and one 2-channel jack 15 is provided in the tape recorder 14. A plug 17 connected to a remote-control unit 16, a plug 19 connected to a microphone 18, a plug 21 connected to an earphone or headphone 20, or an earphone/microphone plug connected to an earphone/microphone (not shown) is selectively connected to the jack 15. The apparatus can readily determine when the plug 17 of the remote-control unit 16 is connected to the jack 15, since the plug 17 is a 2-channel plug. The plugs 19 and 21 on the other hand are both 1-channel plugs.

REC (record), PB (playback), FF (fast-forward), and REW (rewind) buttons are provided on the tape recorder 14 in addition to the jack 15. A sliding pause switch 23, a built-in microphone 24, and a built-in speaker 25 are also provided on the tape recorder 14.

A 1-channel jack 26 is provided on the remote-control unit 16. The plug 19 of the microphone 18 or the plug 21 of the earphone or headphone 20 is selectively connected to the jack 26. A sliding pause switch 27 and a built-in microphone 28 are also provided on the remote-control unit 16.

The operation of this system is as follows:

When the plug 19 is inserted into the jack 15 of the tape recorder 14 to set a REC mode, recording can be performed with the microphone 18. When the plug 21 is inserted into the jack 15 to set a PB mode, a reproduced sound can be listened to from the earphone or headphone 20 (these actions in the REC and PB modes are the same as those of the tape recorder shown in FIG. 1).

When the 2-channel plug 17 is inserted in to the jack 15 to connect the remote-control unit 16 to the tape recorder 14, the connection is detected by a control circuit (to be described later). As a result, the function of the pause switch 23 of the tape recorder 14 is disabled. At the same time, the function of the pause switch 27 of the remote control unit 16 is enabled. In this state, the buttons 22 are selectively used to set a desired mode and the pause switch 27 is slid to the START position. Then, the tape recorder 14 is operated in the set mode. In this case, if the REC mode is set, recording can be performed with the built-in microphone 28. When the PB mode is set, a reproduced sound can be listened to from the speaker 25 of the tape recorder 14. In the REC mode, when the plug 19 is inserted into the jack 26 of the remote-control unit 16, recording can be performed with the microphone 18. In the PB mode, when the plug 21 is inserted into the jack 26, a reproduced sound can be listened to from the earphone or headphone 20. In this manner, when the plug 19 or 21 is inserted into the jack 26, the remote-control unit 16 serves as a link connector of the recording or reproduced signal. In this case, the built-in microphone 24 and the speaker 25 are not operated.

Figure 3:
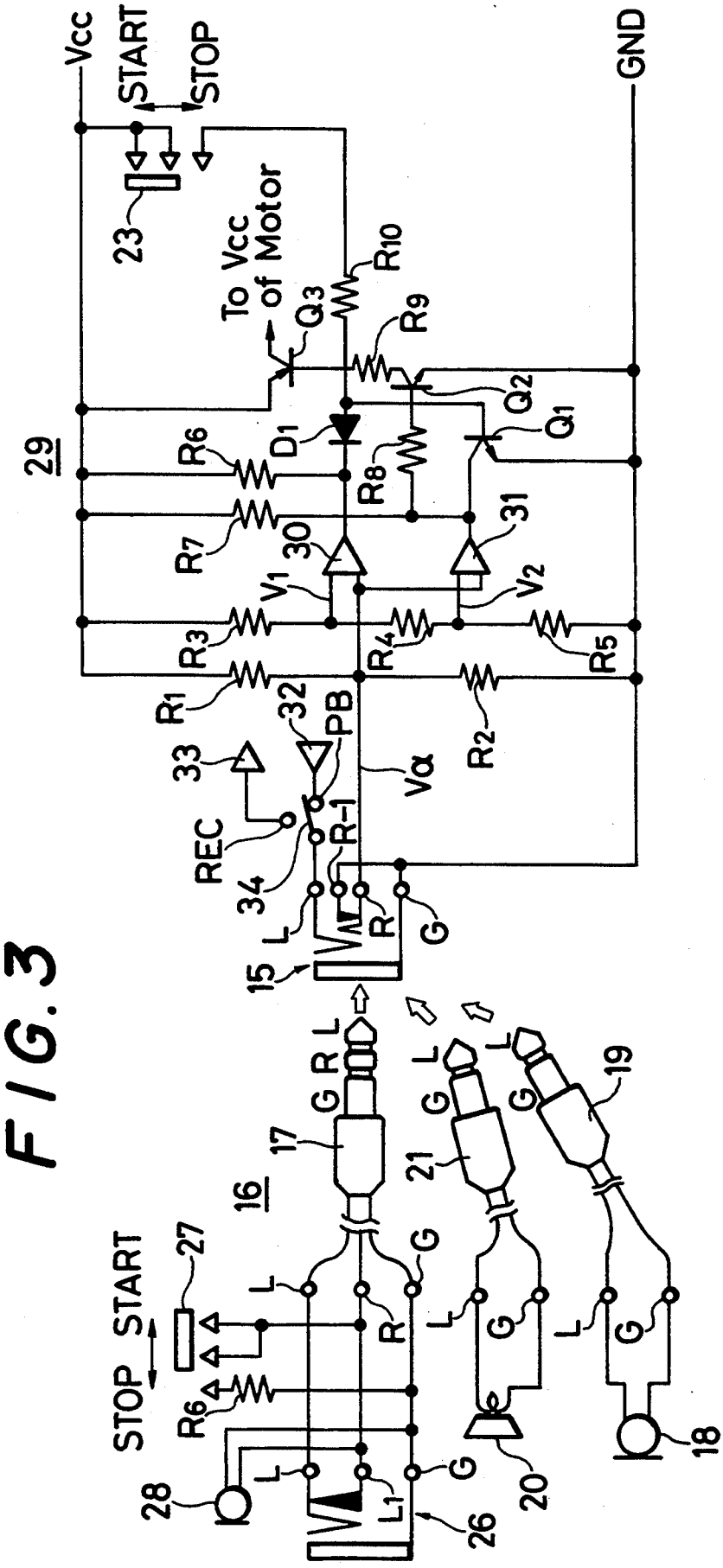
FIG. 3 is a detailed circuit diagram of the tape recorder system shown in FIG. 2.

FIG. 3 shows a detailed arrangement of a control circuit 29 for disabling the function of the pause switch 23 upon detection of the insertion of the 2-channel plug 17 into the jack 15. The reference characters in FIG. 3 that are also employed in FIG. 2 denote the same parts in FIG. 3 as in FIG. 2.

In FIG. 3, 2-channel terminals R and L and a ground terminal G are arranged in the remote-control unit 16. These terminals can be connected to terminals R, L and G of the plug 17. The STOP contact of the pause switch 27 is connected to the terminal G of the remote-control unit 16 through a resistor $R_6$. The common and START terminals of the pause switch 27 are connected to the terminal R of the remote-control unit 16. Terminals L and G of the jack 26 are respectively connected to the terminals L and G of the remote-control unit 16, as shown in FIG. 3.

Terminals L and G of the microphone 18 and the earphone or headphone 20 are respectively connected to corresponding terminals L and G of the plugs 19 and 21.

In the control circuit 29, terminals L, R, R-1 and G are provided in the jack 15. A voltage V obtained from the terminal R is supplied to one input terminal of each of comparators 30 and 31. A reference voltage $V_1$ obtained by voltage-dividing a power source voltage Vcc by a resistor $R_3$ and a set of resistors $R_4$ and $R_5$ is applied to the other input terminal of the comparator 30. A reference voltage $V_2$ obtained by voltage-dividing the power source voltage $V_{cc}$ by the resistor $R_5$ and the set of resistors $R_3$ and $R_4$ is applied to the other input terminal of the comparator 31. When the pause switch 23 is set to the START or STOP (pause) position, a transistor $Q_3$ is ON/OFF-controlled to enable or disable a power source for a tape drive motor (not shown).

When no plug is inserted into the jack 15, the terminals R and R-1 of the jack 15 are kept in contact with each other. The voltage V is then at ground potential. In this case, outputs from the comparators 30 and 31 are set at a high level. When the pause switch 23 is switched to the START position as shown in FIG. 3, the power source voltage Vcc is applied to the base of a transistor $Q_2$ through resistors $R_7$ and $R_8$ to turn on the transistor $Q_2$. The ON state of the transistors $Q_2$ enables the transistor $Q_3$, so that the power source voltage is applied to the tape drive motor (not shown). A recording tape starts running, and the tape recorder 14 is operated in whatever mode has been set. Note that the mode of the tape recorder 14 is preset with selective operations of the buttons 22 (FIG. 2).

When the pause switch 23 is switched to the STOP position, the power source voltage Vcc is applied to the base of a transistor $Q_1$ through the pause switch 23 and a resistor $R_{10}$, thereby turning on the transistor $Q_1$. Upon ON operation of the transistor $Q_1$, the base potential of the transistor $Q_2$ is decreased to turn off the transistor $Q_2$. Therefore, the transistor $Q_3$ is turned off to stop the tape, and the pause state is set.

When the 1-channel (monaural) plug 19 or 21 is connected to the jack 15, the terminal R of the jack 15 is grounded by the plug 19 and 21. The circuit state established in this case is therefore the same as in the case wherein no plug is inserted into the jack 15. The operation can be controlled with the pause switch 23. In the PB mode, a reproduced signal obtained from a playback amplifier 32 is supplied to the earphone or headphone 20 through a contact PB of a recording/playback switch 34 and the terminals L of the jack 15 and the plug 21. In the REC modes the recording (input) signal is supplied from the microphone 18 to a recording amplifier 33 through the terminals L of the plug 19 and the jack 15 and a contact REC of the switch 34.

When the 2-channel plug 17 of the remote control unit 16 is inserted into the jack 15, the terminal R-1 is separated from the terminal R of the jack 15. In this case, when the pause switch 27 of the remote-control unit 16 is set at the STOP position, a resistor $R_6$ is connected in parallel with the resistor $R_2$ in the control circuit 29. The voltage V determined by the resistors $R_1$, $R_2$ and $R_6$ is applied to the comparators 30 and 31. The output of the comparator 30 is set at a high level, and the output of the comparator 31 is set at a low level. The signal of low level disables the transistor $Q_2$. The OFF operation of the transistor $Q_2$ in turn disables the transistor $Q_3$, thereby setting the pause state. Then, even if the pause switch 23 of the tape recorder 14 is set in the START position, the state of the apparatus remains unchanged; i.e., the apparatus remains in the pause state.

When the pause switch 27 of the remote-control unit 16 is then moved to the START position, the resistor $R_6$ is disconnected, and the voltage V is changed accordingly so that the output of the comparator 30 is set at a low level and the output of the comparator 31 is set at a high level. Therefore, the transistors $Q_2$ and $Q_3$ are sequentially turned on to start tape travel. Even when the pause switch 23 is set at the STOP position in this state, the voltage $V_{cc}$ drops at the resister $R_{10}$ so that the anode voltage of a diode $D_1$ is such as to keep the transistor $Q_1$ in the OFF state. The transistor $Q_2$ thus remains turned on.

As described above, when the plug 17 is inserted into the jack 15 to connect the remote-control unit 16 to the tape recorder 14, the function of the pause switch 23 of the tape recorder 14 is disabled and the function of the pause switch 27 of the remote-control unit 16 is enabled.

In the REC mode under the condition that the remote-control unit 16 is connected to the tape recorder 14, recording can be performed with the built-in microphone 28. A recording (input) signal is supplied to the recording amplifier 33 through the terminals L and L-1 of the jack 26, the terminal L of the plug 17, the terminal L of the jack 15 and the switch 34. When the plug 19 is inserted into the jack 26 to connect the microphone 18 to the tape recorder, the terminal L-1 is separated from the terminal L of the jack 15. In this case, the built-in microphone 28 cannot be used.

In the PB mode under the same condition as described above, when the plug 21 is inserted into the jack 26 to connect the earphone or headphone 20 to the tape recorder 14, a reproduced signal from the playback amplifier 32 is supplied to the earphone or headphone 20 through the jack 15, the plug 17 and the jack 26. That is, when the plug 19 or 21 is inserted into the jack 26, the remote-control unit 16 serves as a link connector. Even if the remote-control unit 16 is used as a link connector, remote-control operation of the pause switch 27 can be performed. Therefore, even if the remote-control unit is used together with the external earphone 18 or the external microphone or headphone 20, the user need insert only one plug 17 into the jack 15 of the tape recorder 14.

The embodiments described above exemplify monaural recording and playback modes of the tape recorder 14. However, the present invention is also applicable to a stereo tape recorder. In addition, the microphone 18 and the earphone or headphone 20 may be constituted by common electromagnetic means. The scope of the invention is therefore limited only by the appended claims.

I claim:

1. Apparatus for switching between recording and playback modes of a tape recorder, comprising:
    a single input/output jack compatible with at least two channels and arranged in a tape recorder main body;
    a single plug that can be connected to said input/output jack and is compatible with said channels;
    a remote-control unit connected to said plug and comprising a remote-control switch for outputting a control signal for controlling a remote-control operation of the tape recorder and an input/output unit that inputs or outputs an audio signal; and
    means for supplying the control signal to said tape recorder main body through one channel of each of said input/output jack and said plug and for transmitting the audio signal as either an input or an output through the other channel of each of said jack and said plug when said plug is connected to said input/output jack.

2. Apparatus according to claim 1, wherein said remote-control switch includes a pause switch for performing ON/OFF control of at least a pause function for pausing travel of a tape.

3. Apparatus according to claim 1, further comprising recording amplifier means having an input terminal, playback amplifier means having an output terminal, and switching means for selectively switching said input terminal of said recording amplifier means and said output terminal of said playback amplifier means upon switching between the recording and playback modes.

4. Apparatus for switching between recording and playback modes of tape recorder, comprising:
  a tape recorder main body;
  a single jack compatible with at least two channels and formed in the tape recorder main body, said two channels respectively transmitting control and audio signals;
  a predetermined operation switch arranged in said tape recorder main body;
  detecting means connected to said jack for detecting whether a 1-channel plug or a 2-channel plug is inserted into said jack;
  a control circuit, responsive to said detecting means, for enabling a function of said predetermined operation switch when a 1-channel plug is inserted and for disabling the function of said predetermined operation switch when a 2-channel plug is inserted; and
  a remote-control unit and a plug which is compatible with said two channels and connected to said remote-control unit and to said jack; said remote-control unit comprising a remote-control switch for outputting a control signal for performing a remote-control operation of the tape recorder and an input/output unit which inputs or outputs an audio signal, whereby said predetermined operation switch and said remote-control switch can selectively be used to control the same function.

5. Apparatus according to claim 4, wherein said remote-control switch includes a pause switch for performing ON/OFF control of at least a pause function for pausing travel of a tape.

6. Apparatus according to claim 4, further comprising means for supplying the control signal to said tape recorder main body through one channel of each of said jack and said plug compatible with the two channels and for inputting/outputting the audio signal through the other channel of each of said jack and said plug when said plug is connected to said jack.

7. Apparatus according to claim 4, further comprising a plug compatible with one of said channels and connected to said signal system means and to said jack.

8. Apparatus according to claim 7, wherein said signal system means is output signal system means.

9. Apparatus according to claim 7, wherein said signal system means is input signal system means.

10. A remote-control unit for a tape recorder, comprising a remote-control switch for outputting a control signal for performing a remote-control operation of the tape recorder and a single input/output unit to which output signal system means or input signal system means can be connected and which inputs or outputs an audio signal, said remote-control unit further comprising a single plug compatible with two channels and supplying the control signal to the tape recorder through one of said channels and the audio signal as either an input or an output through the other of said channels.

* * * * *